July 29, 1958 L. E. JOHNSON ET AL 2,845,489
SYNCHRONIZING SYSTEM
Filed Feb. 11, 1954 10 Sheets-Sheet 5
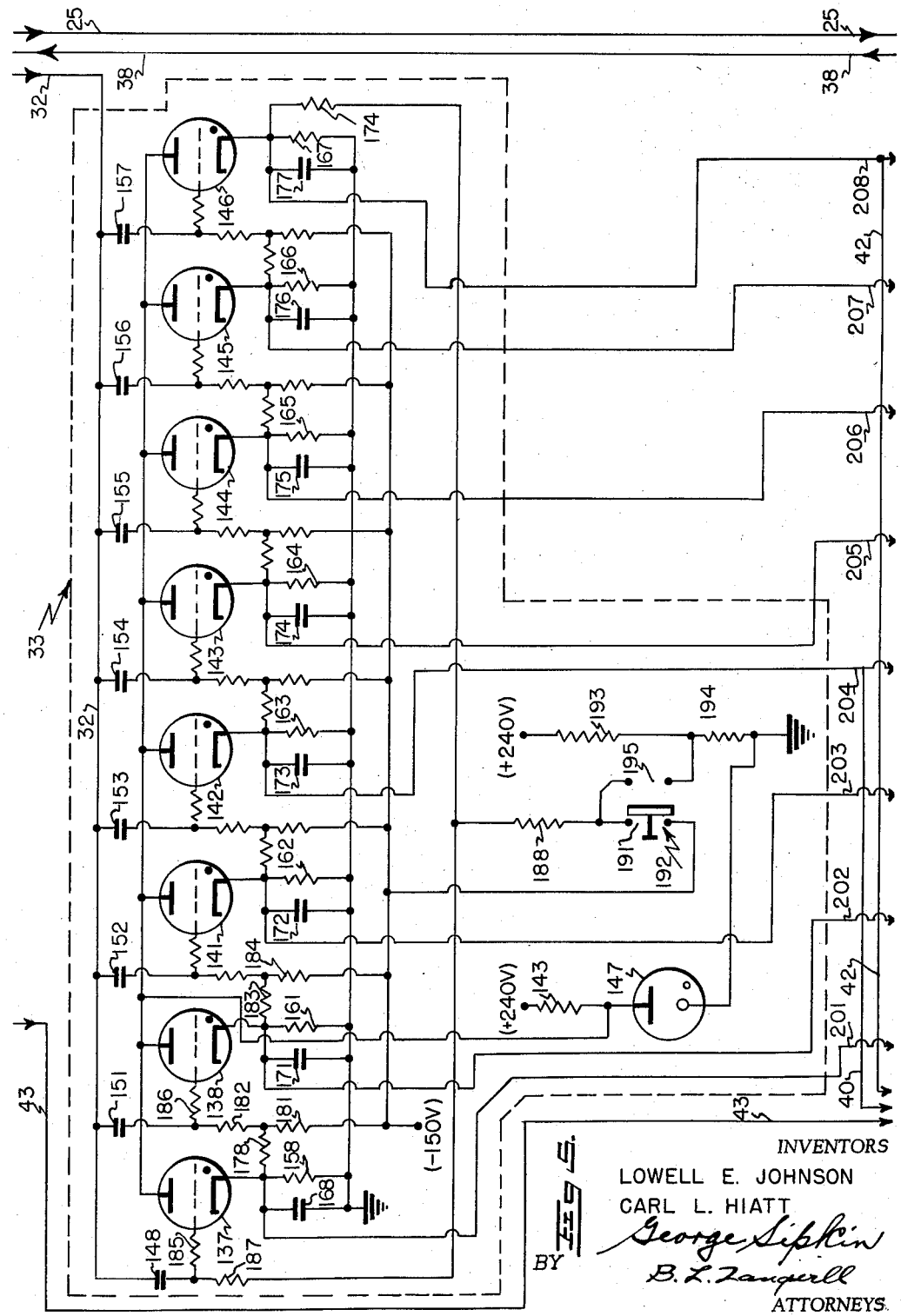
INVENTORS
LOWELL E. JOHNSON
CARL L. HIATT
BY
ATTORNEYS

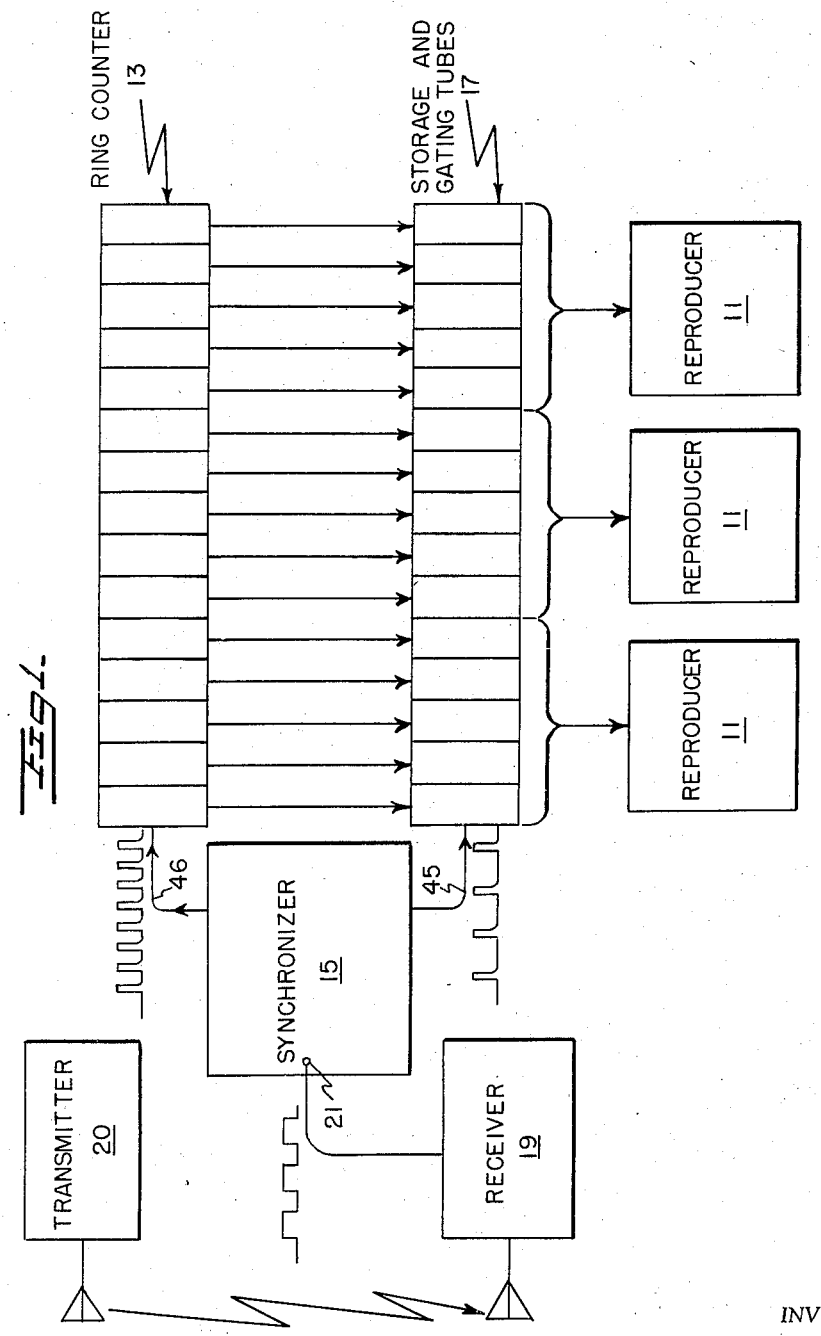

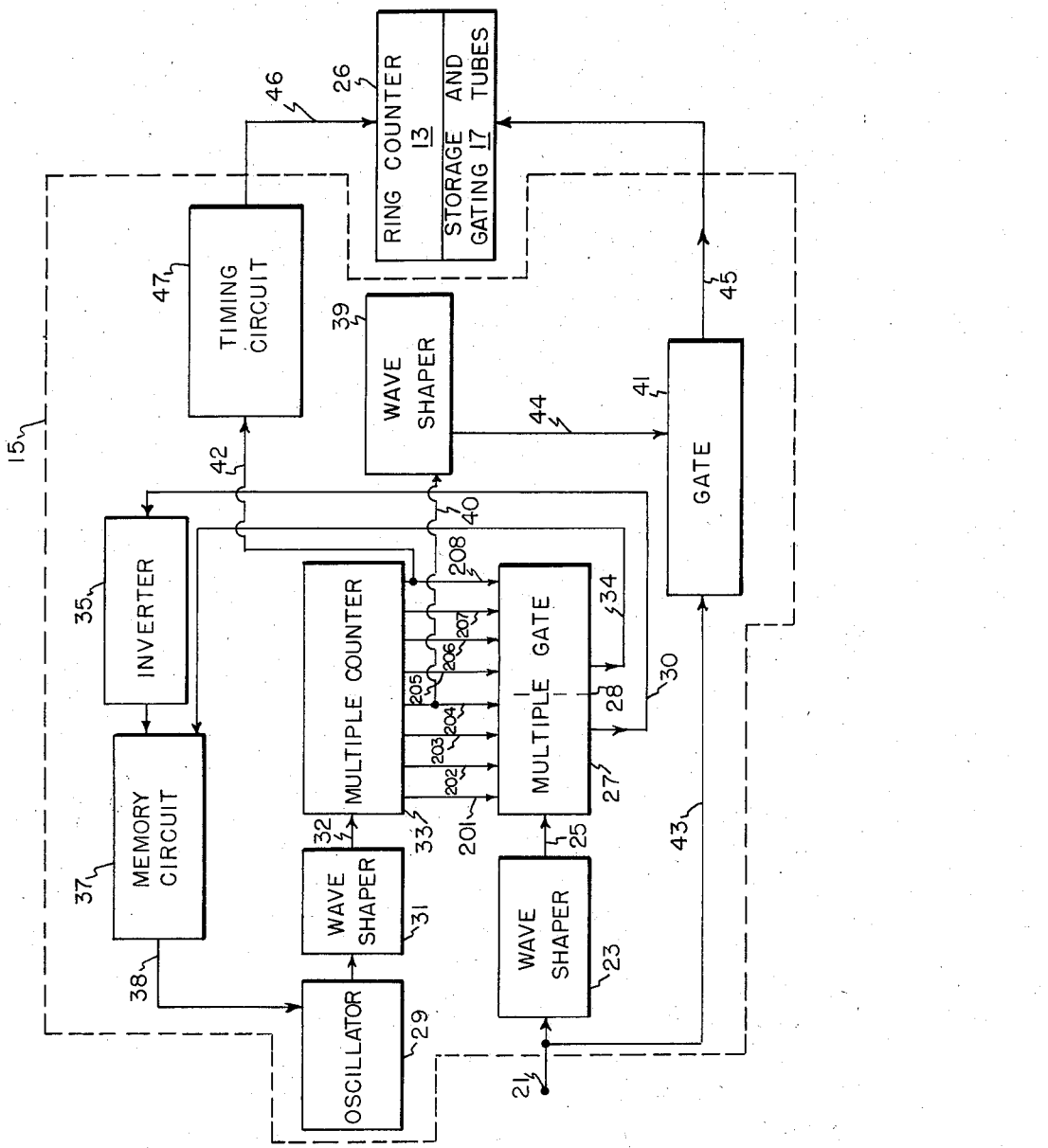

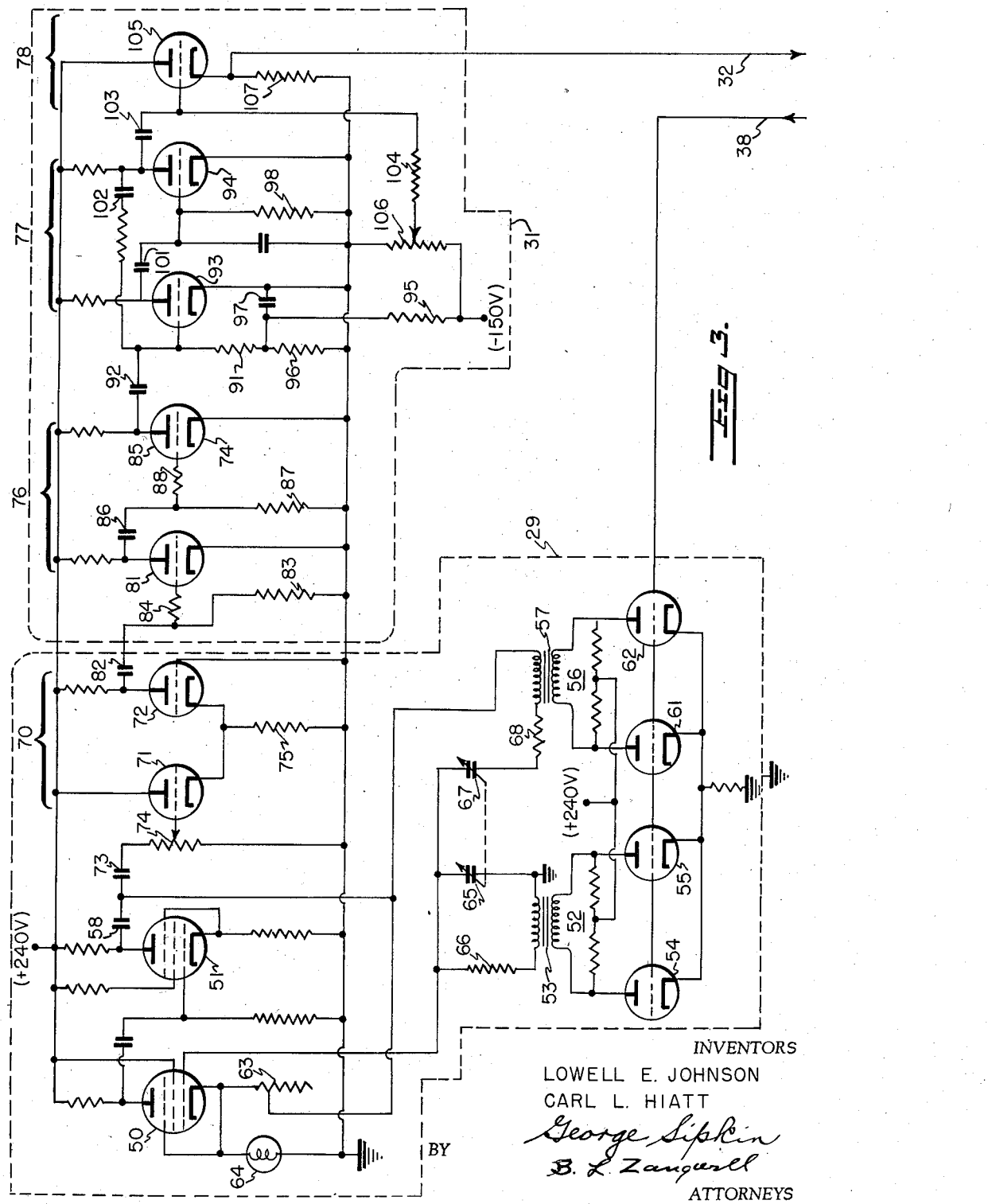

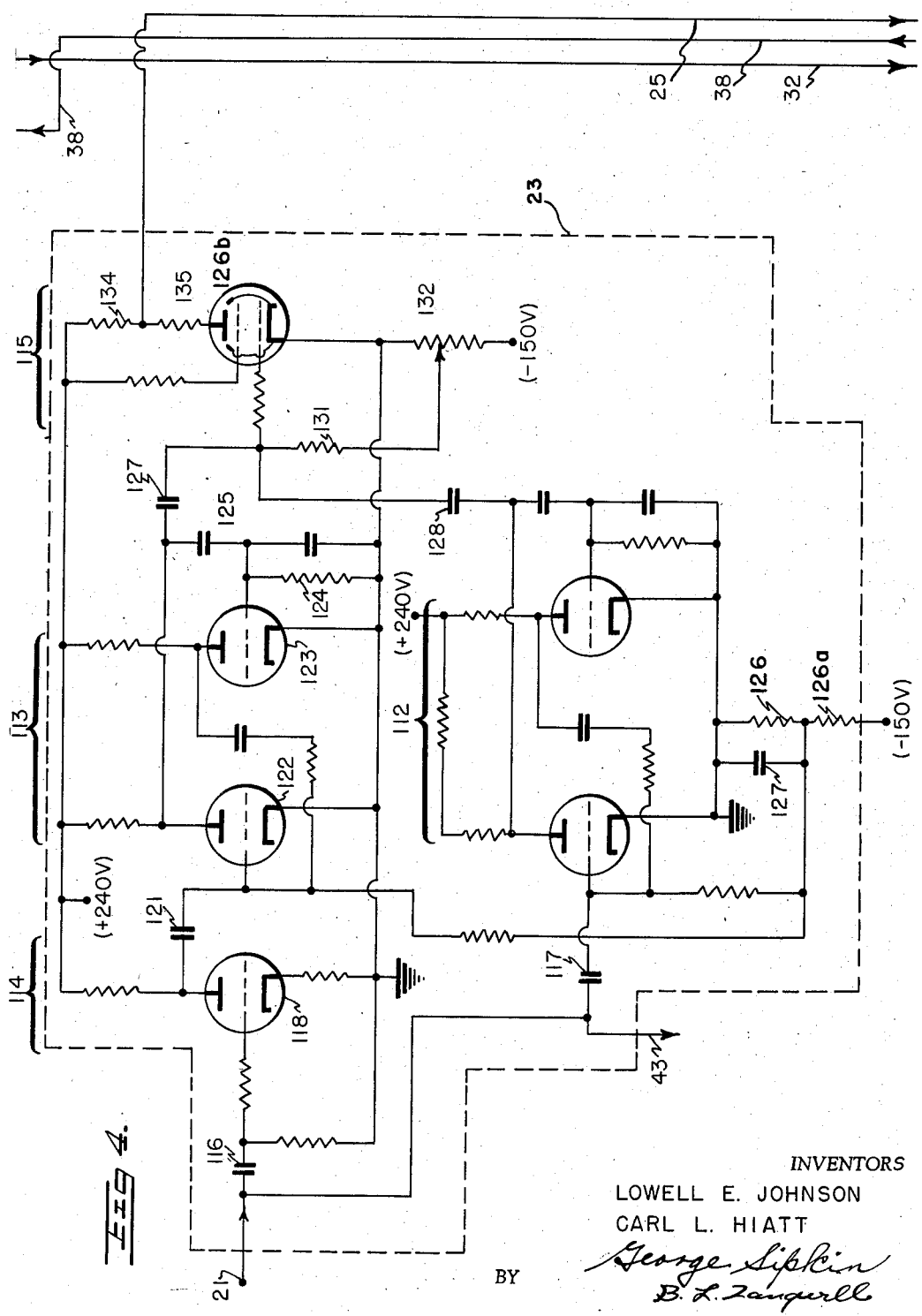

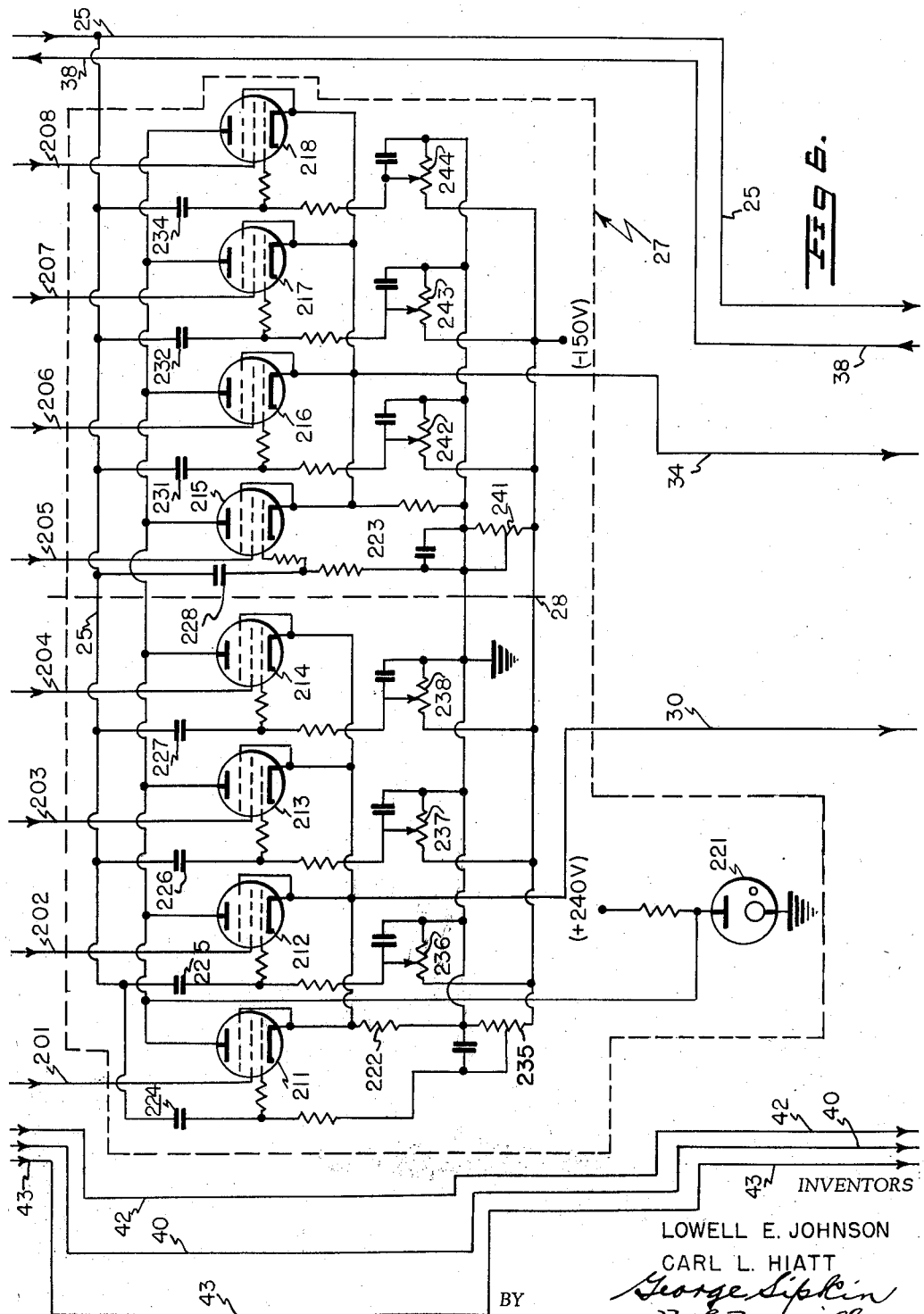

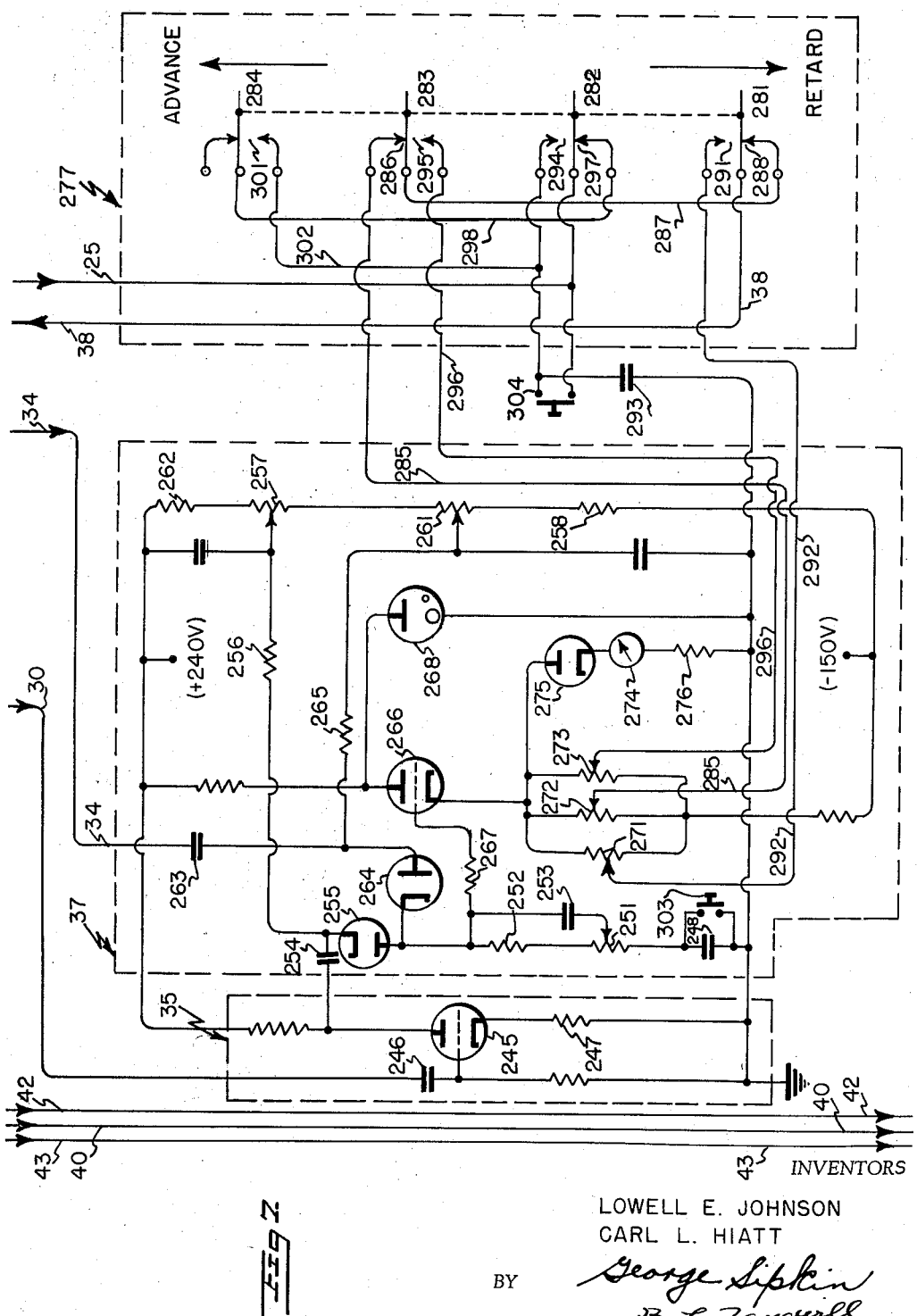

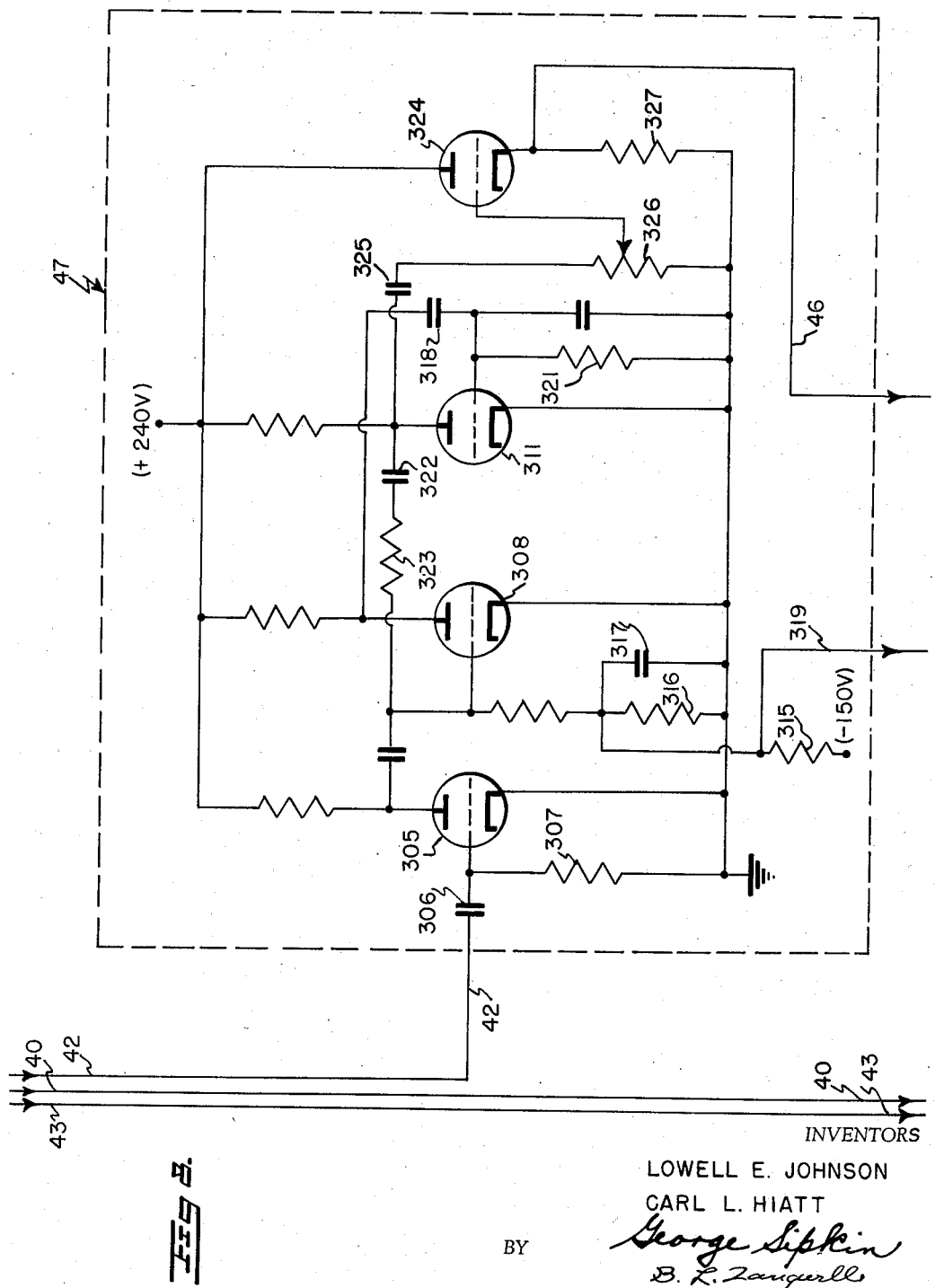

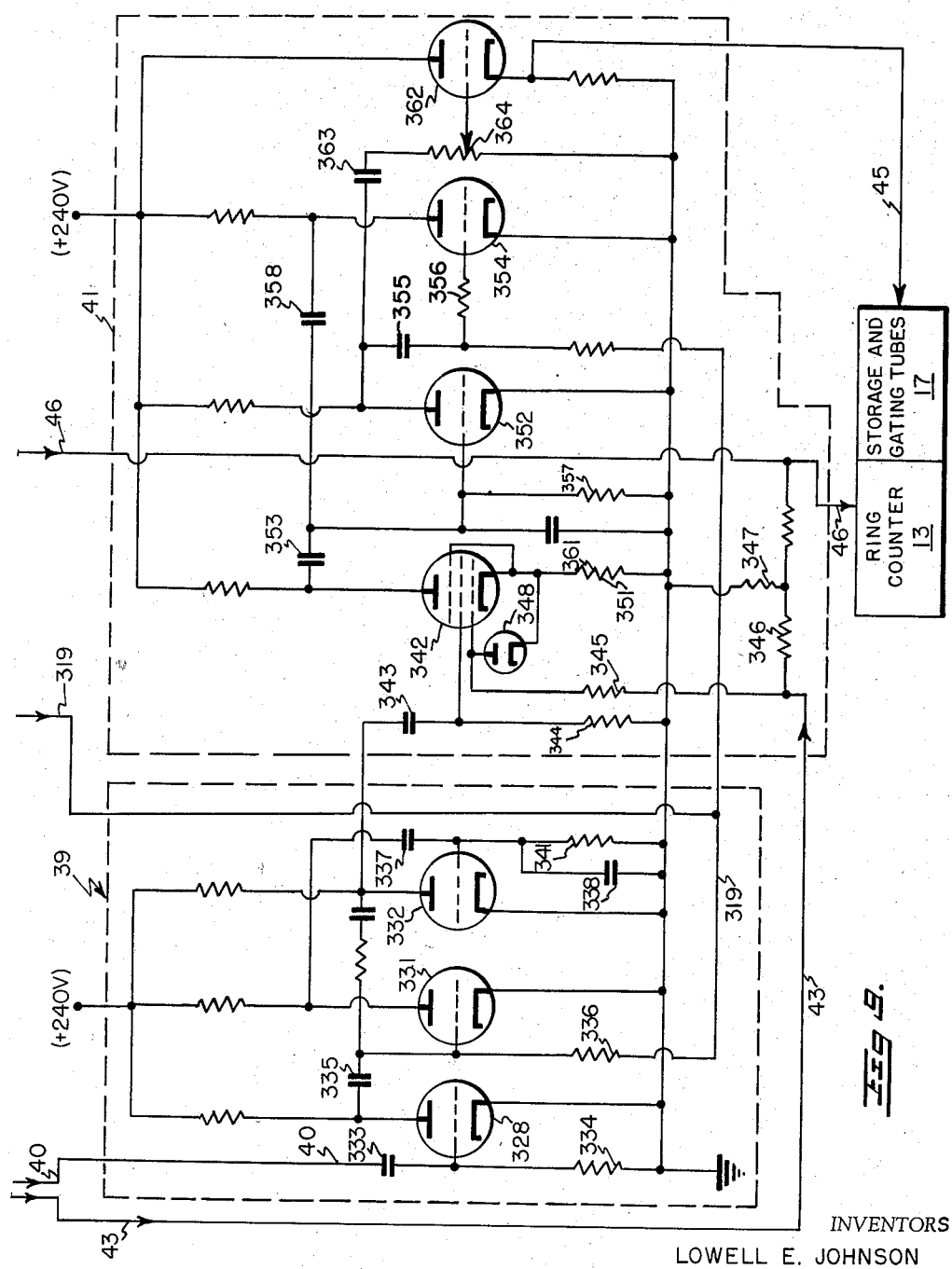

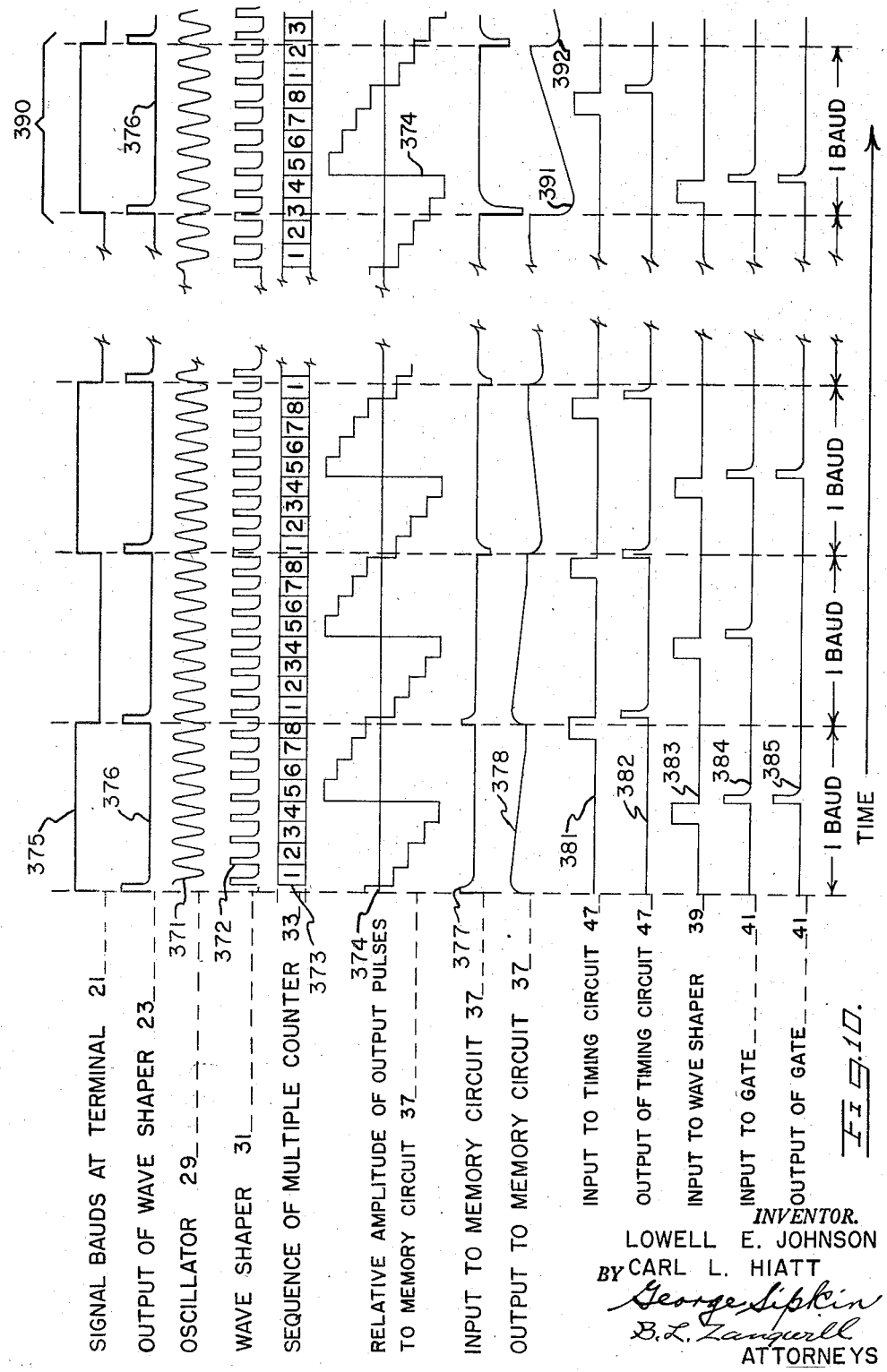

United States Patent Office 2,845,489
Patented July 29, 1958

2,845,489

SYNCHRONIZING SYSTEM

Lowell E. Johnson, Wayzata, and Carl L. Hiatt, St. Paul, Minn., assignors, by mesne assignments, to the United States of America as represented by the Secretary of the Navy Application February 11, 1954, Serial No. 409,785

5 Claims. (Cl. 178—53)

This invention relates to electrical pulse signalling systems in general and in particular to receiving apparatus for such systems operative to extract and interpret information transmitted.

In pulse signaling systems a commonly employed procedure is to convert the intelligence to be transmitted into a form which may be represented in binary characterization, that is as either one or the other of two extremes.

An example of a binary code system is that employed in the printing telegraph machines in which all letters, numbers, punctuation, etc. are transmitted by a five-component code employing equal pulse intervals during an operating cycle wherein a signal is either present or absent at any particular instant of time. Whenever a pulse is transmitted, a corresponding relay in the deciphering equipment is caused to move to an actuated position, so that a particular series of pulses, or bauds, will operate to select a single corresponding type bar, which is actuated to reproduce the desired character when the series is completed. The machine is prepared to receive a subsequent series of pulses after such actuation.

It is frequently desirable to transmit a plurality of messages over a single circuit simultaneously, in order to reduce the amount of equipment required to handle a given volume of traffic. One method of accomplishing this result, or multiplexing, is to divide the transmission time of each cycle between several transmission channels. Such a time-division multiplex system may employ any number of receiving units or channels, and the pulses or bauds necessary to form a letter may be transmitted in sequence and interlaced between other similar series of pulses or the bauds themselves may be interlaced.

The signals intended for one channel are separated from the remaining signals by a series of storage devices in connection with a timing circuit, so that signals received at proper time intervals are stored and applied to the corresponding channel. When all the time intervals associated with a particular channel have passed, the reproducing unit is actuated to reproduce the transmitted character, and the cycle of operation continued for as long as necessary to complete the message or messages.

It is accordingly an object of the present invention to provide apparatus for use in a pulse signalling which is capable of determining the existence of the no-signal condition. Another object of the present invention is to provide an apparatus for synchronizing the operation of a receiving device which is a component of a pulse signalling system.

Other and further objects and features of the invention will become apparent to those skilled in the art as the disclosure is made in the following detailed description of a preferred embodiment of the invention as illustrated in the accompanying drawings wherein:

Fig. 1 shows in block form a communication system with which the present invention is usable;

Fig. 2 is a block diagram illustrating the synchronizing system of the present invention;

Figs. 3 to 9 inclusive, taken together, constitute a schematic diagram of a preferred embodiment of a synchronizing system constructed in accordance with the teachings of the present invention.

Fig. 10 shows a series of wave forms taken to illustrate the operation of the synchronizing system of the present invention.

Referring to Fig. 1, there is illustrated a time division multiplex receiving system in which it is assumed that there are three reproducers 11 each operated by a five baud code are to be operated sequentially. The reproducing units 11 each require that the bauds received during a particular portion of an operating interval be stored and used to actuate that unit, after which the unit is returned to its original condition. It will be noted that three units each requiring five bauds will require a total of fifteen storage units.

Timing for the system is provided by means of a fifteen segment ring counting circuit 13 which extinguishes a conducting tube and renders the subsequent tube conductive each time a timing pulse is received from the synchronizing unit 15 as later explained. Conduction of any one of the segments of the ring counter circuit 13 renders a corresponding one of the gas-filled storage and gating tubes 17 capable of being rendered conductive by a pulse representing reception of a baud, also from the synchronizing unit 15. Any storage and gating tube remains conductive until extinguished by the corresponding reproducing unit 11. It will therefore be apparent that each gating and storage tube may be rendered conductive at the particular instant of time during which the corresponding segment of the ring counting circuit 13 is also conductive.

The synchronizing unit 15 comprises a continuously operating source of timing pulses which occur in accurate phase and at the recurrence rate of the baud signals impressed on the system. As illustrated herein, the synchronizing circuit 15 may be actuated by the demodulated signal from the radio receiver 19 which is in turn responsive to the transmitter 20.

The portion of the transmitted baud which is least affected by adverse transmission conditions is the center portion, and it is therefore advantageous to employ this portion of the baud to control the reproducers 11 to the exclusion of the remaining portions. The present invention employs a small portion of the time duration of the baud near the center thereof to sample the output of the receiver 19 for the presence or absence of a received baud. In order to insure that the center position of the baud is actually selected to operate the reproducers 11, the phase of the oscillator 29 of Fig. 2 must be accurately maintained with respect to the incoming bauds. The oscillator 29 must therefore be capable of being controlled in frequency from a phase-measuring circuit later to be described.

The present invention is directed to the synchronizing unit 15, which is illustrated in block form in Fig. 2. The signals from the receiver in demodulated form are impressed on the terminal 21 of the synchronizing unit 15 and are applied to the wave shaper 23 which produces from each received signal a pair of signals of short duration, one signal at the beginning of a received baud and a second signal at the end thereof. Both signals are typically of the same polarity, positive, and are delivered through line 25 to the multiple gate circuit 27.

The multiple gate circuit 27 additionally receives a plurality of control signals, typically eight in number, to provide output signals depending upon the time occurence of the output signals from wave shaper 23. The control signals of the multiple gate are applied through a series of components terminating at the oscillator 29 which is operative to produce a sinusoidal signal having a frequency typically eight times the normal recurrence frequency of received pulse signals. Sinusoidal oscillation thus produced by the oscillator 29 are distorted to appear as a series of pulses of the same frequency by operation of the wave shaping circuits of block 31. The resulting pulses are applied to an eight-stage multiple counter circuit 33 which operates to supply the control signals to the multiple gate circuit 28. The operation of the eight stage counter 33 is such that the signal output therefrom experiences a complete cycle of operation for every eight pulses applied thereto from the wave shaper 31. Thus the eight stage counter 33 and the multiple gate circuit 27 are caused to operate at a frequency which is equal to that of the normal recurrence frequency of received signals. The operation of the multiple gating circuits is controlled by means of the multiple counter, so as to provide output signals at a gating stage which are dependent upon the time position of the output signals from wave shaper 23 relative to the complete cycle of operation of the multiple counter 33.

The individual circuits in the multiple gate 27 are "opened" by the simultaneous application thereto of a timing pulse from the multiple counter 33 and a pulse from the wave shaper 23, and the circuits of the multiple gate are divided into two parts about a dividing point 28 near its center. Each of the two parts is arranged to produce an output voltage upon activation of a circuit whose magnitude increases from a minimum at the ends to a maximum adjacent the dividing point.

Since the wave shaper 23 produces two pulses from each received baud, two circuits in the multiple gate 27 are caused to produce output voltages in the same cycle, which voltages are subtracted from each other to produce a voltage used to correct the phase of the oscillator 29 by momentarily increasing or decreasing its frequency.

When the two circuits of the multiple gate 27 which are opened in a particular cycle are symmetrically disposed with respect to the dividing point 28 mentioned above, the two output voltages are equal and no correction is applied to the oscillator 29. However, if the, "opened" circuits of the multiple gate are unevenly spaced from the dividing point, there is a corrective voltage produced which varies in polarity and magnitude with the sense and extent of such deviation.

Output signals from the multiple gates circuit 27 are impressed on the memory circuits 37 to provide a control voltage which persists for more than a single operation and to maintain the control voltage for the oscillator 29 during time intervals in which no baud is received by the receiver 19. The output voltage of one part of the multiple gate circuit 27 is impressed on the inverter 35 to reverse its polarity, so that the output voltage of the memory circuits 37 may reverse in polarity.

Near the middle of each cycle of operation of the multiple counter 33, a positive polarity pulse is delivered by one circuit of the counter 33 to the wave shaping circuit 39 which produces therefrom a short duration positive pulse coincidental with trailing edge of the pulse from counter 33. The signal output of wave shaper 39 is employed to partially unblock a gating circuit 41 to which is also applied the signals from the receiver output as obtained by line 43. When the pulse from wave shaper 39 is applied to gate 41 in coincidence with a received pulse as obtained from receiver 19, the gate circuit 41 operates to provide an output pulse signal in line 45. In distinction to this, however, if the gate circuit 41 does not receive a signal from the line 43 at the time of occurrence of the pulse applied thereto from wave shaper 39, the gate circuit 41 will not operate to provide an output pulse signal.

From this brief description, therefore, it is seen that the apparatus of the present invention operates to provide a means of sensing the time intervals at which a receiver output signal must occur and to determine whether or not such signal does occur at that time, and to provide separate output signals characteristic of the conditions wherein the pulse signal occurs and wherein it does not. To this end the apparatus of the present invention has an internal frequency source which, although of a highly stable nature, is readily correctable to maintain synchronism in the operation thereof relative to the normal recurrence frequency of received signals.

In addition, the synchronizing unit also provides a series of timing pulses which are usable to synchronize the reproducing units 11 with signals received from the transmitting station.

Details of specific circuitry for accomplishing the functions of the various sections of the block diagram of Fig. 2 are shown in the schematic diagram which consists of the Figures 3–9 which, taken together and assembled provide a complete apparatus showing all interconnections between the various components.

Referring now to Fig. 3, the oscillator 29 may be of any desired type whose frequency may be readily controlled by the application thereto of an external voltage, and is illustrated herein as being of the bridge type for the purposes of illustration. The oscillator 29 comprises tubes 50 and 51 coupled to each other in conventional fashion with the amplified output of tube 51 being coupled to the input of tube 50 through a frequency-sensitive bridge which controls the frequency of the produced oscillation and through the coupling capacitor 58. The frequency-sensitive bridge is of the Wien type and includes a pair of circuits 52, 56 which act as electronically controlled variable resistances, circuit 52 comprising the transformer 53 and tubes 54, 55, while circuit 56 comprises the transformer 57 and tubes 61, 62.

The circuit of Wien bridge may be traced as follows: From the low voltage side of the coupling capacitor 58 through the resistance 63 to the cathode of tube 50 and thence through the negative-temperature-coefficient resistor 64 to ground, and from ground through the parallel circuit comprising capacitor 65, resistor 66 and the variable resistance circuit 52 to the control grid of tube 50, and thence through the capacitor 67, resistor 68 and the variable resistance circuit 56 to the low voltage side of coupling capacitor 58.

The variable resistance circuits 52, 56 are, as previously mentioned, controllable by means of the bias impressed on the tubes 54, 55, 61 and 62, which tubes operate as resistive elements. The resistance of the tubes is reflected into the circuit by means of the respective transformers, the reflected resistance of the tubes decreasing with the conduction thereof.

The operation of the oscillator 29 is similar to that of the well-known Wien-bridge oscillator, with the exception of the external frequency control by means of the variable resistance circuits 52 and 56. The capacitors 65, 67 are ganged for simultaneous operation, and the resistance 63 is made variable to facilitate adjustment of the oscillator 29. The bias voltage which controls the conduction of tubes 54, 55, 61 and 62, and thus controls the operating frequency of the oscillator, is impressed on the conductor 38 hereinafter explained.

The sinusoidal voltage appearing at the anode of tube 51 is applied to an isolation amplifier 70 which may comprise tubes 71 and 72 connected as a two-stage cathode-coupled amplifier. The anode of tube 51 is coupled to the tube 71 through the capacitor 58, capacitor 73, and the potentiometer 74 to ground, and an adjustable portion of the voltage appearing across the potentiometer 74 is applied to the grid of tube 71. A corresponding voltage appears across the cathode resistor 75, which voltage is applied to the cathode of tube 72, since the cathodes of tubes 71 and 72 are connected together. Since the grid of tube 72 is connected to ground, a similar voltage in amplified form appears at the anode of tube 72, which voltage is coupled to the wave shaper 31.

The wave shaper 31 may comprise a limiter 76 to produce square waves from the sinusoidal wave received from the oscillator 29. The square wave output of the limiter is differentiated into pulses at the beginning and ending of each square wave, which pulses are used to control a multi-vibrator 77 for producing a discrete pulse for each actuation. The pulses from the multi-vibrator 77 are in turn impressed upon an isolation amplifier 78.

The limiter 76 as illustrated herein is composed of two triode stages each operated without grid bias. The first stage comprising tube 81 has its control stage coupled to the anode of tube 72 through the capacitor 82 and resistor 83, the resistor 84 preventing appreciable current flow when the grid is driven positive during positive half-cycles and effectively reducing the amplitude of the applied signal voltage. The circuit thus limits the positive half-cycle to a predetermined level which occurs when the conduction of grid current begins. Since the voltage appearing at the plate of the tube circuit is inverted from the voltage applied to its grid, the limited square voltage pulse appearing at the anode of tube 81 corresponding to a positive half-cycle is applied to the grid of tube 85 as a negative pulse, while the uneffected negative half-cycle at the grid of tube 81 is now impressed as a positive half-cycle. The tube 85 being coupled to the anode of tube 81 by means of capacitor 86, resistance 87, and resistance 88, and tube 85 operates in similar fashion to limit positive voltages as does the preceding stage, so that the voltage output at its anode will be a square wave having the same frequency as sinusoidal voltage from the oscillator 29. The voltage at the anode of tube 85 is impressed on the resistor 91 through a small coupling condenser 92 to produce a voltage across the resistor 91 which is a series of positive and negative pulses, the positive pulses being used to trigger a multi-vibrator 77.

The multivibrator 77 comprises tubes 93 and 94, which tubes have their cathodes grounded. The grid of tube 93 is returned through the resistor 91 to a point of negative potential provided by the voltage divider composed of resistors 95 and 96 connected between 150 volts and ground, the capacitor 97 stabilizing the voltage appearing across the resistance 96. Tube 93 is thus biased sufficiently negative to normally render it nonconducting, so that negative pulses appearing across resistance 91 are without effect on the circuit while positive pulses allow the tube to conduct current.

The tube 94 is normally conducting because its grid is returned to ground through resistance 98. When the tube 93 is rendered conducting by a positive pulse applied to its grid, the potential at its anode decreases because of the voltage drop in its anode resistor. This decrease is applied to the grid of tube 94 through the coupling capacitor 101 to cut that tube "off," thus causing the potential at its anode to rise. The rise in the potential of the anode of tube 94 is coupled to the grid of tube 93, to further increase its conduction by capacitor 102, which conduction continues until the capacitor 101 becomes charged sufficiently to allow the tube 94 to again conduct. When the tube 94 again conducts current, the potential at its anode drops, which drop is coupled to the grid of tube 93 to stop its conduction, so that the circuit returns to its stable state.

The output voltage appearing at the anode of tube 94 will appear as a positive pulse, which is coupled by the capacitor 103 and resistor 104 to the grid of tube 105 in the isolation amplifier 78. The tube 105 is connected to a cathode follower having its grid returned by resistor 104 to an adjustable point of negative potential provided by the potentiometer 106 connected between minus 105 volts and ground. The voltage appearing across cathode resistor 107 provides an output voltage which is applied to the conductor 32.

Referring now to Fig. 4, demodulated bauds from the receiver 19 are impressed on the terminal 21 of the wave-shaper 23, which signals are in the form of square positive-going pulses.

The demodulated bauds are differentiated and the pulses used to actuate two multivibrator circuits 112 and 113, each of which produces a positive pulse of short duration when actuated by a positive pulse. The multi-vibrator 112 is actuated directly from the terminal 21, while the multivibrator 113 is actuated through the inverter 114, and the positive pulse outputs of both multi-vibrators are impressed on the isolation amplifier 115. For brevity, only the multivibrator 113 will be described in detail, since the multivibrator 112 is similar in all respects.

The coupling capacitors 116 and 117 are made small to differentiate the respective baud into a positive pulse at the beginning and a negative pulse at the end thereof. The inverter 114 produces at the anode of tube 118 a negative pulse at the beginning and a positive pulse at the end of the baud, which pulses are coupled through the coupling capacitor 121 to the grid of tube 122 in multi-vibrator 113.

The multivibrator 113 comprises the normally non-conducting tube 122 and normally conducting tube 123, the grid of tube 123 being returned to ground through resistor 124 and the grid of tube 122 being returned to a point of negative potential supplied by resistors 126 and 126a connected between —150 volts and ground, the capacitor 127 stabilizing the voltage across the resistor 126.

The negative pulse from the coupling capacitor 121 has no effect on the operation of normally non-conducting tube 122, but the positive pulse causes the tube 122 to become conductive, and the decrease in its anode voltage is applied to the grid of tube 123 through coupling capacitor 125 to render that tube non-conducting for the time period required to charge the capacitor 125. After the capacitor 125 is charged, the circuit returns to its normal state, having produced a positive pulse at the anode of tube 123 at the end of the baud. Similarly, the multi-vibrator 112 produces a positive pulse at the beginning of the baud.

The grid of the tube 126 in the isolation amplifier 115 is coupled to the normally non-conducting tube of multi-vibrator 113 through the capacitor 127, and to the normally non-conductive tube of multi-vibrator 112 through the capacitor 128, while the grid is returned through the resistor 131 to a point of negative potential provided by the potentiometer 132 connected between —150 volts and ground. The tube 126 is biased to conduct a high current, so that the negative pulses from the multi-vibrators produce positive pulses at the anode of the tube, part of these pulses being applied to conductor 133 by the anode resistors 134 and 135.

The baud from terminal 21 is also applied to conductor 43, for a purpose later to be described.

Referring now to Fig. 5, there is shown the multiple counter 33 which comprises eight identical counter circuits operating sequentially and including the gas filled tubes 137, 138, 141, 142, 143, 144, 145, and 146. The anodes of the tubes are connected together and to a source of voltage regulated by the gaseous regulator tube 147, and the control grids are coupled through capacitors 148, 151, 152, 153, 154, 155, 156, and 157 to the conductor 32. However the control grids of the gas filled tubes are returned to —150 volts while the cathodes are connected through voltage dividers as hereinafter explained to a point slightly negative with respect to ground.

The amplitude of the positive pulses applied from the wave shaper 31 to conductor 32 is insufficient to overcome the bias applied to grids of the tubes unless the negative grid bias is reduced. However, the cathode resistors 158, 161, 162, 163, 164, 165, 166, and 167 are of such high resistance as to allow the control grid to regain control after the tubes are triggered the capacitors 168, 171, 172, 173, 174, 175, 176, and 177 delaying deionization of the respective tubes for a time interval determined by the R-C constants of the circuit.

Since the several circuits are similar, a detailed discussion of the operation of only the stages including tubes 137 and 138 is believed necessary. The cathode of tube 137 is connected to ground through the resistor 158, and to —150 volts through resistors 178 and 181. The grid of tube 138 is connected to the juncture of resistors 178 and 181 through the grid resistor 182.

The cathode of tube 138 is also provided with a divider network composed of resistors 161, 183 and 184, the grid of tube 137 being returned to a similar juncture associated with tube 146. Resistances 185 and 186 serve to prevent the flow of appreciable grid current through the respective tubes.

If the tube 137 is non-conducting at a given instant, the grid of tube 138 is biased to a highly negative voltage, and is unaffected by pulses applied thereto from conductor 32. However, if the tube 137 is triggered to conduction, its cathode is raised from a negative to a positive voltage with respect to ground, and the grid of tube 138 is raised to a point where a pulse applied to its grid from conductor 32 will render that tube conductive, the tube 137 extinguishing itself after a short time interval. The conduction of tube 138 reduces the negative bias of tube 141 to a point at which that tube can be made conductive and so on. This procedure progresses from stage to stage with each tube "priming" a subsequent tube.

It will be observed that it is necessary for the operation of the counter circuit that one tube be made conductive to start operation, and a manual circuit is provided which will trigger tube 137. The grid resistor 187 of tube 137 is normally connected to —150 volts through resistance 188 and the normally closed contacts 191 of push-button 192. Actuation of the push button 192 connects the resistance 188 to a point of positive potential provided by the resistors 193 and 194 through the normally open contacts 195, which "primes" tube 137 to allow triggering of the remaining tubes from the positive pulses from the wave shaper 31.

When a gas tube in the counter 33 is rendered conductive, its cathode is raised from a negative voltage to a positive voltage as previously mentioned, and this positive voltage pulse from each tube is taken off by the conductors 201, 202, 203, 204, 205, 206, 207, and 208 to be applied to respective stages of a multiple gate 27.

The multiple gate 27 is shown in Fig. 6 and comprises a plurality of multi-grid vacuum tubes 211, 212, 213, 214, 215, 216, 217 and 218 whose conduction is controlled by the simultaneous application thereto of a positive pulse from one of the gas filled tubes of the counter circuit and a positive pulse from the wave shaper 23 over conductor 25. The tubes 211, 212, 213, 214, 215, 216, 217, and 218 have their anodes connected to a source of power regulated by the gaseous regulator tube 221. The cathodes of tubes 211, 212, 213, and 214 are connected together and to ground through resistor 222, and the cathodes of tubes 215, 216, 217, and 218 are connected together and to ground through the resistor 223.

The control grids of the tubes 211, 212, 213, 214, 215, 216, 217 and 218 are coupled to the conductor 25 through capacitors 224, 225, 226, 227, 228, 231, 232, 233, and 234, the grids thereof being returned to individualized potentiometers 235, 236, 237, 238, 241, 242, 243, and 244, which provide adjustment of the current conduction of the individual tubes as later described herein. The screen grids of the tubes 211–218 are connected to the respective conductors 201–208, which conductors are connected to the respective cathodes of the gas tubes 137, 138, 141, 142, 143, 144, 145, and 146 in the multiple counter 33 previously described.

The potentiometers 235 and 244 are adjusted to cause equal low currents to flow through tubes 211 and 218 when actuated so as to produce equal voltages of a low amplitude across the resistors 222 and 223. Potentiometers 236 and 243 are adjusted to cause equal currents of higher magnitudes through tubes 212 and 217, while potentiometers 237 and 242 cause still higher magnitudes through tubes 213 and 126 and potentiometers 238 and 241 cause yet higher currents through tubes 214 and 215.

As previously mentioned, two pulses are produced from each received baud by the wave shaper 23 and impressed on conductor 25, so that two tubes in the multiple gate 27 are rendered conductive in each cycle. If the tubes rendered conductive are adjusted to conduct equal currents, equal voltages will be produced across resistors 222 and 223, thus indicating that the counter circuit 33 is properly synchronized with the received signals. However, if the two tubes rendered conductive conduct unequal currents, the voltages across resistors 222 and 223 will be unequal, and these voltages, taken off by conductors 30 and 34, are used to correct the deviation from synchronism.

The memory circuit 37 is shown in Fig. 7 and acts to apply a corrective voltage to the oscillator 29 over line 38 which varies the frequency thereof to maintain synchronism between the receiving system and the transmitter, which voltage is proportional to the voltage appearing on conductor 30 or 34, which voltage is always positive. In order to provide a polarity reversal with the sense in deviation from synchronism, the voltage pulses impressed on conductor 30 is applied to the inverter 35 to reverse its polarity, and are applied to the grid of tube 245 herein through capacitor 246, the tube 245 operating with an unbypassed cathode resistor 247. The output pulse at the anode of tube 245 is therefore of opposite polarity and of approximately the same magnitude as the voltage pulses from conductor 30, because of the degeneration introduced by the resistor 247.

The inverted pulse from the anode of tube 245 and the pulse from conductor 34 are now of opposite polarity, and are impressed on the memory circuit 37, where they are applied to an integrating circuit which includes the capacitor 248, potentiometer 251, resistor 252, and capacitor 253. The inverted pulse from the anode of tube 245 is applied to the integrating circuit through the coupling capacitor 254 and the diode 255, the cathode of the diode being connected to the coupling capacitor and returned to a potential slightly above ground by means of the resistor 256 and the potentiometer 257, the potentiometer 257 being part of the voltage divider connected between 240 volts and —150 volts and comprises resistor 258, potentiometer 261, and resistor 262, in addition to potentiometer 257.

The voltage pulse from conductor 34 is impressed on the integrating network through capacitor 263 and diode 264, the anode of the diode being connected to the coupling capacitor 263 and the cathode being connected through resistor 265 to a point of negative potential with respect to ground provided by the potentiometer 261 mentioned above.

The potentiometers 257 and 261 are adjusted to render the diodes 255 and 264 normally non-conducting so as to prevent the capacitor 248 from discharging therethrough. When a pulse is applied to the capacitor 248, a voltage is produced across the unbypassed portion of potentiometer 251 to cause fast phase correction by the oscillator 29. However, frequency correction for extended periods is controlled by the charge on capacitor 248.

The voltage appearing on the integrating network is impressed on the control grid of tube 266 through resistor 267. The potential at the anode of tube 266 is maintained constant by means of gaseous regulator tube 268 and the cathode thereof is connected to —150 through potentiometers of 271, 272, and 273 which have their resistive elements connected in parallel with each other. A milliammeter 274 connected in series circuit with the diode 275 and variable resistance 276 is connected between the cathode of tube 266 and ground to indicate the operation of tube 266. In synchronism, the milliammeter 274 is adjusted to mid-scale, to thus provide an indication of sense and magnitude of any deviation from normal operation.

The cathode of tube 266 normally operates at a positive potential with respect to ground, and the voltage appearing at the movable arm of potentiometer 272 is adjusted to zero at synchronism, which voltage is impressed on the conductor 38 to control the frequency of the oscillator 29.

For convenience in adjusting the apparatus and initially synchronizing the receiving equipment with the transmitting station, a control unit 277 is provided which serves to advance or retard the received bauds with respect to the counter circuit 33. The control unit 277 consists of a plurality of double-throw switches 281, 282, 283, and 284 each having a normal center position with a closed circuit therethrough, the switches being ganged for simultaneous operation. In the normal position shown in Fig. 7, the movable arm of potentiomoeter 272 is connected by wire 285 to the normally closed contact 286 of switch 283 and thence by wire 287 and the normally closed contacts 288 of switch 281 to conductor 38.

If the switches 281, 282, 283, and 284 are actuated upward to the "advance" position, normally closed contacts 288 are opened and normally open contacts 291 are closed, thus connecting conductor 38 through wire 292 to the movable arm of potentiometer 271, that movable arm being adjusted to provide a negative potential which reduces the frequency of the oscillator 29. At the same time, the output voltage of wave shaper 23 is shunted to ground through capacitor 283 by means of conductor 25 and the normally open contacts 294 on switch 282.

When the switches 281, 282, 283 and 284 are actuated downward to the "retard" position, wire 287 is disconnected from wire 285 by opening the normally closed contacts 286 and connected by closing the normally open contacts 295 on switch 283 and wire 296 to the movable arm of potentiometer 273, which movable arm is adjusted to produce a positive potential which increases the frequency of the oscillator 29. The output voltage of the wave shaper 23 appearing on conductor 25 is shunted to ground through normally closed contacts 297 on switch 282, wire 298, normally open contacts 301 on switch 284, and wire 302.

Push button switch 303 is provided to discharge capacitor 248, for convenience in initially adjusting the synchronizer, and push button switch 304 is provided to manually shunt the output of wave shaper 23 for the purposes of adjustment of the equipment.

Timing pulses for synchronizing the reproducing units 11 are produced by the timing circuit 47 (Fig. 8). The pulse from the cathode of tube 146 in the counter circuit 33 is conducted via conductors 208 and 42 to the control grid of tube 305 through the coupling capacitor 306 which is made small to differentiate the pulse into a sharp negative-going pulse at the control grid. The differentiated pulse is amplified and inverted in tube 305 and appears as a positive pulse at the anode thereof, and is used to trigger the multi-vibrator circuit comprising tubes 308 and 311. The tube 308 is normally non-conducting, while tube 311 is normally conducting. The pulse from the anode of tube 305 is coupled to the grid of tube 308 by means of the coupling capacitor 312, the grid resistor 313 being returned to a point of negative potential provided by a voltage divider composed of resistors 315 and 316 connected between ground and −150 volts. The capacitor 317 serves to stabilize the voltage with respect to ground at the juncture of resistors 315 and 316, and conductor 319 serves to conduct this voltage to other circuits as hereinafter explained.

The output from the anode of tube 308 is coupled to the control grid of tube 311 by means of coupling capacitor 318 and grid resistor 321 connected to ground, and the anode of tube 311 is coupled to the control grid of tube 308 through capacitor 322 and resistor 323. The application of a positive pulse to tube 308 renders that tube conductive and tube 311 non-conductive for a time interval and therefore produces a positive pulse at the anode of tube 311, in conventional fashion.

The positive pulse at the anode of tube 311 is coupled to cathode follower tube 324 through capacitor 325 and potentiometer 326, the cathode being connected to ground through resistor 327. The output voltage of the cathode follower tube 324 is taken from its cathode resistor 327 as a positive pulse by means of conductor 46.

The wave shaper 39 and the gating circuit 41 are shown in Fig. 9, the wave shaper comprising the amplifier tube 328 and the multi-vibrator circuit including tubes 331 and 332. The positive pulse appearing at the cathode of tube 142 is taken off by conductors 204 and 40 and applied through the coupling capacitor 333, which capacitor is made small to differentiate the pulse to a sharp negative-going spike which is impressed on the control grid of tube 328. The control grid of tube 328 is returned to ground through resistor 334, and the amplified pulse appears at the anode of the tube as a positive-going pulse.

The positive-going pulse at the anode of tube 328 is impressed on the control grid of the normally non-conducting tube 331 in the multi-vibrator by the capacitor 335 and resistor 336, the resistor 336 being connected to a point of negative potential provided by wire 319. When the tube 331 is thus rendered conductive, the normally conductive tube 332 is rendered non-conductive and produces a positive pulse at its anode of a length determined by the time constant of capacitors 337 and 338 and resistors 341.

The pulse appearing at the anode of tube 332 is coupled to the screen grid of gate tube 342 in gate circuit 41 through coupling capacitor 343 and resistor 344, while the control grid of gate tube 342 is connected to the input terminal 21 through conductor 43 and resistor 345, the control grid being returned to ground through resistors 346 and 347. The diode 348 is connected between the control grid and the cathode of tube 342 to prevent positive excursions of the grid thereof.

The tube 342 is normally biased to non-conduction by virtue of the zero potential applied to the screen grid thereof when the tube 332 is non-conducting, and the tube 342 is therefore normally unresponsive to its control grid. However, when the tube 332 is momentarily rendered non-conductive, the positive potential applied to the screen grid of tube 342 renders that tube responsive to its control grid, and any signals impressed on the control grid during such non-conduction of tube 332 will be amplified and appear at the anode thereof. The cathode of tube 342 is connected to ground through the unbypassed resistor 351 to introduce degeneration into the stage.

The negative output pulse appearing at the anode of tube 342 is coupled through capacitor 353 to the control grid of the normally conductive tube of a multi-vibrator including tubes 352 and 354, tube 352 being normally non-conductive. When tube 352 is rendered non-conductive by the negative pulse, the tube 354 is rendered conductive through the action of capacitor 355 and resistor 356 for a time interval determined by the constants of resistor 357 and capacitors 358 and 361. The positive pulse thus produced at the anode of tube 352 is coupled to the control grid of cathode-follower tube 362 through capacitor 363 and potentiometer 364, the cathode being connected to ground through the resistor 365. The control grid of tube 362 is connected to the movable arm of the potentiometer 364, which serves to control the amplitude of the output pulse appearing across resistor 365, which output pulse is connected to the reproducers 11 through the conductor 45.

The length of the baud received from the transmitter 20, should in normal operation correspond to the duration of a complete operation of the multiple counter 33. The two pulses produced by the wave shaper 23 corresponding to the beginning and end thereof will therefore normally occur during the energization of the same segment of the multiple counter circuit 33. The frequency of the oscillator 29 is therefore shifted slightly to advance or retard the relative phasing, so that the pulses occurring in each cycle will, for example, be advanced from segment 1 to segment 8 and then retarded to segment 1 again. Synchronism between the transmitter 20 and the receiving equipment is thus accurately maintained.

The voltage produced across resistor 222 or 223 by energization of a gate tube in the multiple gate 27 are taken off by conductor 30 or 34 is used to correct any deviation from synchronism. If for any reason, the receiving equipment varies from synchronism in either direction, the magnitude of the error signal increases to approximate proportional control of the frequency of the oscillator 29.

The operation of the device may be understood by reference to Fig. 10, which illustrates the sequence of operation of the several circuits of the device. The oscillator 29 produces a sine wave output voltage represented by curve 371 having a frequency which is a multiple of the transmission rate of the transmitted bauds, which output voltage is changed by the wave shaper 31 to resemble that indicated in the curve 372. As previously mentioned, the multiple counter 33 and the multiple gate 27 each have a number of segments equal to the frequency of the oscillator 29 divided by the baud transmission rate, the segments being represented by the blocks 373.

When the respective segments of the multiple gate 27 are rendered conductive, the segments produce differing voltages, the polarity of voltages produced by segments 5, 6, 7 and 8 being reversed in the inverter 35, so that the input voltage to the memory circuit 37 is represented by the curve 374. It will be apparent that segments 1 and 8 produce equal voltages of lower magnitude than the equal voltages produced by segments 2 and 7, and so on.

The signal bauds appearing at terminal 21 is illustrated by curve 375, and the appearance of the baud as changed by the wave shaper 23 is illustrated by curve 376; herein it comprises two positive pulses coinciding with the beginning and end of the signal bauds. If the pulses shown in curve 376 occur at times to render conductive segments of the multiple gate circuit 27 which produce low voltages, equal small voltages are impressed on the memory circuit 37, and produce a small connective voltage to change the frequency of oscillator 29. However, when segments producing higher voltages are rendered conductive by the pulses from the wave shaper 23, a corrective voltage is applied to the oscillator of a polarity to again cause the pulse to occur on segments producing low voltages. The pulses thus applied to the memory circuit are illustrated by curve 377, and the corresponding frequency control voltage is illustrated by curve 378.

When the last segment of the multiple counter circuit 33 is rendered conductive, the positive pulse appearing at its cathode, indicated by curve 381, is impressed on timing circuit 47 where it is converted into a sharp spike illustrated by curve 382, which is impressed on the ring counter 13 of Fig. 1.

Similarly, when the fourth segment of the multiple counter circuit 33 is rendered conductive, the positive pulse appearing at its cathode, indicated by curve 383 is impressed on the wave shaper 39 which produces a corresponding sharp pulse illustrated by curve 384, which pulse is impressed on the screen grid of gate tube 342 in gate circuit 41.

When a baud from terminal 21 is impressed on the control grid of tube 342 at the same time that the voltage pulse shown in curve 384 is impressed on its screen grid, the gating circuit 41 produces an output voltage pulse as indicated in curve 385. However, if no baud is impressed on the control grid at the time the pulse of curve 385 is impressed on the screen grid of tube 342, no output pulse is produced.

The three bauds in the left-hand section of Fig. 10 illustrate the normal operation of the synchronizer 15 in which the frequency of the oscillator 29 is approximately in step with the signal bauds at terminal 21. It will be noted that the phase of the oscillator 29 lags slightly so that the first two pulses 376 from the wave shaper 23 produce positive control voltages 378 from the memory circuit 37. The frequency of the oscillator 29 is increased until the phase advances enough to produce a negative correction voltage as indicated in connection with the later two pulses from the wave shaper 23.

The right-hand section 390 of Fig. 10 illustrates the operation of the synchronizer if the oscillator 29 advances in phase relative to the signal bauds. It will be apparent that the pulses from the wave shaper 23 occur during the conduction of the third segment of the multiple counter 33 and produce a large correction voltage indicated at 391 which produces an immediate frequency change, so that the next pulse occurs on the second segment and produces a smaller voltage 392 as the phase of 374 is corrected.

The signal baud appearing at terminal 21 is of considerably longer duration than that of the pulse from the wave shaper 39, the pulse from the wave shaper 39 normally occurring near the center of the baud which as previously stated, represents the portion thereof which is most nearly free from interference or distortion, so that the presence or absence of a received baud is distinctly determined by the present invention.

In adjusting the apparatus, the receiver 19 is tuned in the usual fashion, and the frequency of the oscillator 29 is adjusted by means of capacitors 65 and 67. Multiple counter circuit 33 is put in operation by momentarily depressing push button 192.

The oscillator 29 is then synchronized with the multiple gate circuit 27 by means of the control unit 277, the meter 274 serving to indicate synchronism. Any charge accumulated on capacitor 248 during adjustment of the circuit is removed by operation of push button 303, and the frequency of the oscillator may be adjusted precisely by means of potentiometer 272 which controls the normal potential impressed on conductor 38. The synchronizing circuit will now produce an accurate timing pulse during each time interval and a signal pulse during each time interval in which a baud is received.

While only a single modification of the present invention has been described herein it will be apparent that many changes and modifications thereof are possible without departing from the spirit thereof, and it is intended to cover all such modifications as fall within the scope of the appended claims.

We claim:

1. In a receiving system for use with baud signals, a source of baud signals having a predetermined cyclic rate, a sinusoidal oscillator having a nominal frequency in harmonic relation to the cyclic rate of the baud signals and being controllable in frequency by means of a frequency control voltage, first wave-shaping means connected to said oscillator to produce a pulse voltage having a cyclic rate equal to the frequency of said oscillator, a multiple counting circuit connected to said wave-shaping means and having a plurality of segments, said segments being sequentially responsive to the pulse voltage to produce gating pulses, a multiple gating circuit having a plurality of pairs of segments, each segment of said multiple gating circuit being responsive to a corresponding segment of said multiple counting circuit, each of said pairs of segments producing different equal voltages when simultaneously actuated by a gating voltage and a pulse signal and said pairs of segments being symmetrically disposed about a center in descending order with progression therefrom, second wave-shaping means connected to said source of baud signals to produce a pair of pulse signals corresponding to the beginning and end of each baud, means for impressing said pulse signals on said multiple gating circuit, whereby a segment of said multiple gating circuit is energized in each cycle, and means connected to said multiple gating circuit and to said oscillator for producing a frequency control voltage varying in magnitude and polarity with segments of said multiple gating circuit actuated by said second wave-shaping means.

2. The device as claimed in claim 1 which further includes third wave-shaping means connected to one segment of said multiple counter circuit to produce timing pulses for use by said receiving equipment.

3. The device as claimed in claim 1 further characterized by a second gating means responsive to simultaneous energization by a timing pulse from said multiple counter circuit and by a baud from said source of baud signals to produce an output pulse.

4. The device as claimed in claim 3 further characterized by a third wave-shaping means connected to one segment of said multiple counter circuit to produce timing pulses for use by said receiving equipment.

5. In a receiving system for use with baud signals, a source of baud signals having a predetermined cyclic rate, a sinusoidal oscillator having a nominal frequency in harmonic relation to the cyclic rate of the baud signals and being controllable in frequency by means of a frequency control voltage, a multiple counting circuit connected to said oscillator means and having a plurality of segments, said segments being sequentially responsive to pulse voltages from the oscillator to produce gating pulses, a multiple gating circuit having a plurality of pairs of segments, each segment of said multiple gating circuit being responsive to a corresponding segment of said multiple counting circuit, each of said pairs of segments producing different equal voltages when simultaneously actuated by a gating voltage and a pulse signal, a wave-shaping means connected to said source of baud signals to produce a pair of pulse signals corresponding to the beginning and end of each baud, means for impressing said pulse signals on said multiple gating circuit to energize a segment of said multiple gating circuit during each cycle, and means connected to said multiple gating circuit and to said oscillator for producing a frequency control voltage varying in magnitude and polarity with segments of said multiple gating circuit which are actuated by said wave-shaping means.

References Cited in the file of this patent

UNITED STATES PATENTS

| | | |
|---|---|---|
| 2,459,699 | Hallmark | Jan. 18, 1949 |
| 2,540,167 | Houghton | Feb. 6, 1951 |
| 2,646,510 | Musselman | July 21, 1953 |